United States Patent [19]

Parmenter et al.

[11] Patent Number: 5,572,723
[45] Date of Patent: Nov. 5, 1996

[54] DYNAMIC CLOCK MODE INDICATOR

[75] Inventors: Kevin C. Parmenter, Carrollton; Yutaka Takahashi, Dallas, both of Tex.

[73] Assignee: Texas Instruments Incorporated, Dallas, Tex.

[21] Appl. No.: 572,133

[22] Filed: Dec. 14, 1995

Related U.S. Application Data

[63] Continuation of Ser. No. 135,698, Oct. 12, 1993, abandoned.

[51] Int. Cl.⁶ ............................................. G06F 1/04
[52] U.S. Cl. ............................................. 395/555
[58] Field of Search ............................ 395/550, 500, 395/750

[56] References Cited

U.S. PATENT DOCUMENTS 4,835,681  5/1995  Culley ................................ 395/500

*Primary Examiner*—Thomas M. Heckler
*Assistant Examiner*—Dennis M. Butler
*Attorney, Agent, or Firm*—J. Dennis Moore; James C. Kesterson; Richard L. Donaldson

[57] ABSTRACT

A dynamic clock indicator (11) is provided for indicating the operating mode of a dynamically clocked system. The clock indicator includes a status pin (13) and a status circuit (15) for indicating status of a variable CPU clock. The status circuit provides a status or mode signal to the status pin.

3 Claims, 2 Drawing Sheets

DYNAMIC CLOCK MODE INDICATOR

This application is a continuation of application Ser. No. 08/135,698, filed Oct. 12, 1993, now abandoned.

NOTICE

Copyright ©, Texas Instruments Incorporated, 1993. A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

TECHNICAL FIELD OF THE INVENTION

This invention relates to dynamic clock mode systems and more particularly to a dynamic clock mode indicator for use with a phase-locked loop circuit.

BACKGROUND OF THE INVENTION

In the prior art, some processing systems have implemented more than one operating speed. In order to change operating modes, these systems have needed to stop execution by the CPU until a PLL has locked onto a desired clock signal. This has resulted in a loss of operating efficiency. Therefore, there has been a need for systems with an improved ability for transition between first and second mode of operation; and, there has been a further need for systems with an ability to sense the particular operating mode of a dynamic operating mode system.

SUMMARY OF THE INVENTION

The present invention provides a dynamic clock indicator for indicating the operating mode of a dynamically clocked system and includes a status pin and a status circuit for indicating a status of a variable CPU clock. The status circuit provides a status or mode signal to the status pin.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
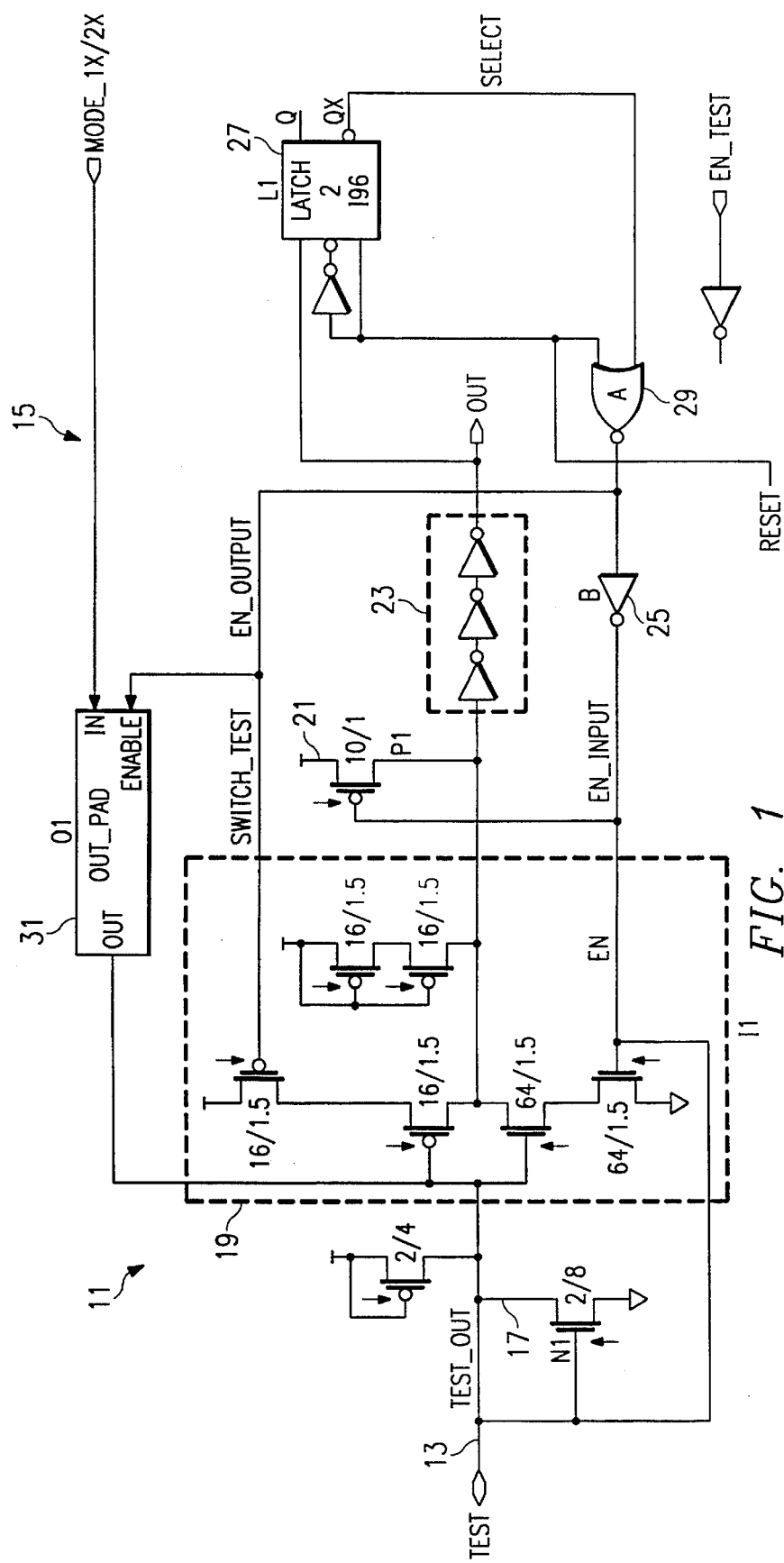
FIG. 1 is a schematic view of the preferred embodiment of a clock mode indicator.

Referring generally to FIG. 1, the preferred embodiment of the present clock mode indicator 11 is depicted for indicating an operational clock mode of a dynamic clock mode processing system. The indicator 11 is attached to a dynamic clock which provides a variable CPU clock mode. The indicator 11 includes a status node 13 for input and output to and from the indicator 11 and supporting status circuitry 15 for sensing the status of the clock mode. The status circuitry 15 provides a status mode signal to the status node 13 when in the output mode, and monitors processor logic levels when in the input mode.

The dynamic clock provides a first or second clock signal. The first clock signal is synchronized to a 1X CPU clock mode or 50% duty cycle. The second clock signal is synchronized to a 2X CPU clock mode.

The dynamic clock includes a dynamic mode switch for switching the microprocessor from a 1X to a 2X mode or vice versa. The attached CPU includes circuitry for maintaining one of the clock modes after the mode switch has changed from a particular setting until the PLL locks.

The status node 13 is configurable as an input during a CPU reset, and when so configured it monitors a logic level driven onto the node 13. The status node 13 is switchable to an output when the CPU reset de-asserts and monitors the status circuitry 15.

The clock mode indicator 11 includes a first transistor 17, an input buffer 19, a second transistor 21, a series of inverters 23, an inverter 25, a latch 27, a NOR gate 29, and an output buffer 31. The first transistor 17 comprises an NMOS transistor which has its drain connected to node 13 and receives an enable input signal for activation. The input buffer 19 connects to node 13 for input and receives an enable input signal and sends an output signal to inverters 23. Transistor 21 is a PMOS transistor activated when disenable input to hold level by the enable input signal and provides an output signal to inverters 23. Inverter 25 delivers the enable input signal for driving the transistor 21. A latch 27 and NOR gate 29 combine to receive the output signal of inverter 23 and a reset signal, AESET and output an enable output signal, EN_OUTPUT, to inverter 25. Inverter 25 provides an enable input signal, EN_INPUT, to input buffer 19. The output buffer 31 receives a dynamic clock mode signal, MODE_1X/2X, and the enable signal, EN_OUTPUT, and sends an output signal. The input signal to output buffer 31 is received externally as a 1X mode signal from the CPU controller. The enable signal received by output buffer 31 is received from the NOR gate 29. The output buffer 31 outputs an output signal for delivery to status node 13. Status node 13 connects to a pin 14 of the microprocessor chip to which the clock mode indicator 11 is attached. This pin 14 receives a test signal, TEST, during input mode, as described in more detail below.

Figure 2:
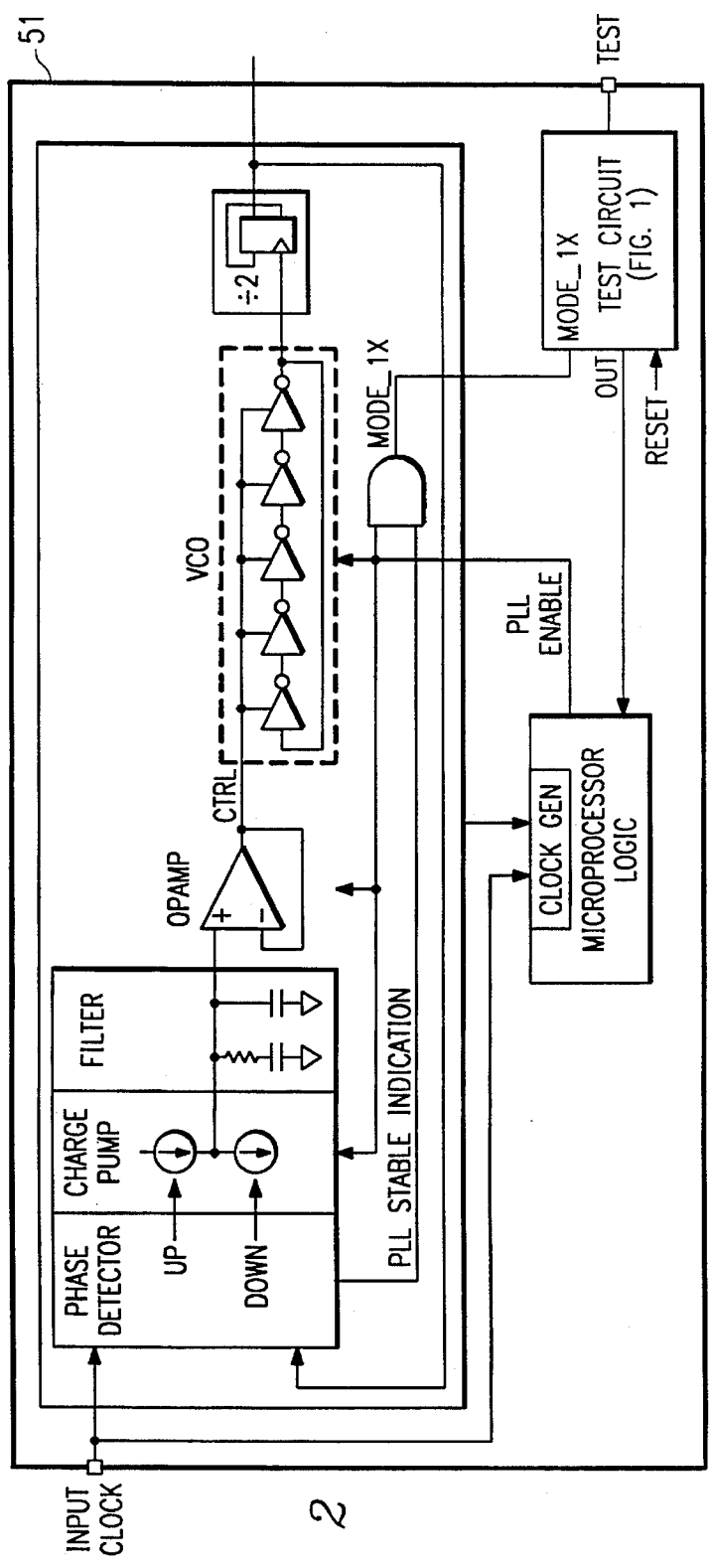
FIG. 2 is a block diagram view of a processor with the clock mode indicator of the preferred embodiment.

FIG. 2 depicts a processor chip which includes the indicator 11 as attached to or implemented with a phase-locked loop circuit.

Figure 3:
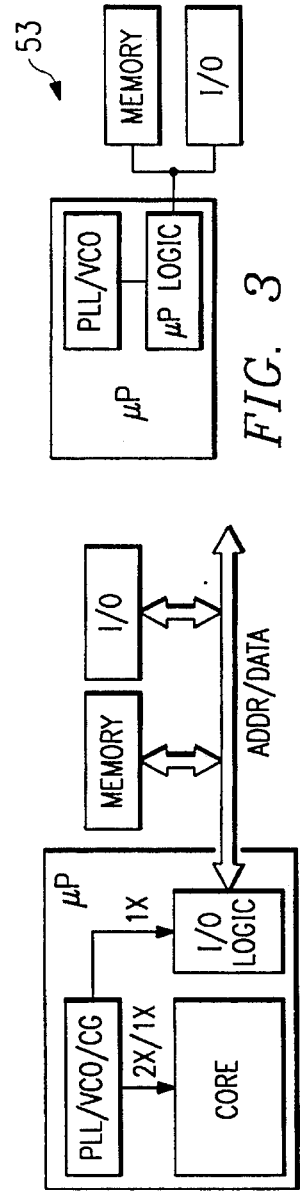
FIG. 3 is a block diagram view of a processing system with the clock mode indicator of the preferred embodiment.

FIG. 3 depicts a processing system implementing the indicator 11 of the present invention.

Returning now to FIG. 1, during output mode, clock information about an attached phase-locked loop circuit is output through clock mode indicator 11. The output operation includes driving the test and reset signals to a high level with the controller setting the enable output signal to a low level; disabling the output buffer 31 by setting the enable input signal to a high level; disabling the input buffer 19; disabling transistor 21 which otherwise drives the output signal, an enabling transistor 17 for driving the test signal; setting an output signal to a high level; setting a select signal to a low level; maintaining the enable output signal at the low level; driving the reset signal to a low level and tri-stating a test signal driver with a controller; latching the output signal at the high level and the select signal at the low level; setting the enable output signal to a high level; enabling the output buffer and driving the test signal with a signal clock mode value; setting the enable input signal to a low level; disabling the input buffer 19; enabling transistor 21 to drive the output signal to a low level; and disabling transistor 17.

The input operation includes driving a test signal to a low level and a reset signal to a high level with a controller; setting an enable output signal to a low level; disabling output buffer 31; setting an enable input to a high level; enabling an input buffer 19; disabling transistor 21 and enabling transistor 17; setting an output signal to a low level; setting a select signal to a high level; maintaining the enable output signal at a low level; driving the reset signal to a low level and tri-stating a test signal driver with the controller; latching the output signal at the low level and the select signal at the high level; maintaining the enable output signal at the low level; disabling the output buffer 31; maintaining the enable input at the high level; driving the test signal to a low level with transistor 17; and disabling transistor 21.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A clock mode indicator for indicating a clock mode of a processing system, selectable during assertion of a reset signal, comprising:

a pin, usable as an input;

an output circuit, connected to receive a clock mode signal and provide said signal to said pin;

an input circuit, connected to receive data on said pin and provide said data to said processing system;

selection means, responsive to the assertion of said reset signal and to a select signal asserted on said pin, for enabling said output circuit, disabling said input circuit and thereby selecting said pin for indicating clock mode when said reset signal is asserted and a first predetermined signal level of said select signal is asserted, and for, alternatively, enabling said input circuit, disabling said output circuit and thereby selecting said pin for use as an input when said reset signal is asserted and a second predetermined signal level of said select signal is asserted.

2. A clock mode indicator as in claim 1, wherein said output circuit is an output buffer circuit, and wherein said input circuit is an input buffer.

3. A clock mode indicator as in claim 1, wherein said output circuit is enabled by assertion of an output enable signal;

said input circuit is enabled by assertion of an input enable signal;

said selection means includes means for asserting said output enable signal and non-asserting said input enable signal when said pin is selected for indicating clock mode, and for asserting said input enable signal and non-asserting said output enable signal when said pin is selected for use as an input.

* * * * *